United States Patent [19]

Nicholson

[11] Patent Number: 4,913,617
[45] Date of Patent: Apr. 3, 1990

[54] REMOTE TONG/TOOL LATCH AND STORAGE BRACKET FOR AN ADVANCED SERVO-MANIPULATOR

[75] Inventor: John R. Nicholson, Oak Ridge, Tenn.

[73] Assignee: Martin Marietta Energy Systems, Inc., Oak Ridge, Tenn.

[21] Appl. No.: 221,689

[22] Filed: Jul. 20, 1988

[51] Int. Cl.⁴ .......................................... B25J 15/04
[52] U.S. Cl. .................................. 414/729; 414/736; 901/30; 901/36; 901/29; 294/86.4
[58] Field of Search .................. 901/30, 31, 41, 29, 901/36, 37, 38, 45; 29/568, 50; 294/86.4; 414/729, 731, 730, 4, 736

[56] References Cited

U.S. PATENT DOCUMENTS

| | | | |
|---|---|---|---|
| 4,488,241 | 12/1984 | Hutchins et al. | 901/45 X |
| 4,549,846 | 10/1985 | Torii et al. | 901/30 X |
| 4,636,135 | 1/1987 | Bancon | 901/41 X |
| 4,674,946 | 6/1987 | Crawford | 901/31 X |
| 4,815,780 | 3/1989 | Obrist | 901/41 X |

FOREIGN PATENT DOCUMENTS

| | | | |
|---|---|---|---|
| 3514167 | 10/1986 | Fed. Rep. of Germany | 901/41 |
| 3521821 | 1/1987 | Fed. Rep. of Germany | 901/36 |
| 2104696 | 4/1972 | France | 294/86.4 |
| 0673421 | 7/1979 | U.S.S.R. | 29/50 |
| 1288047 | 2/1987 | U.S.S.R. | 901/29 |

OTHER PUBLICATIONS

Engineering drawings dated 2-15-79 entitled "Master-Slave Manipulator Rotary Drive Tong Assembly", by Central Res. Laboratories, Inc., Red Wing, Minn.

Primary Examiner—Robert J. Spar
Assistant Examiner—James T. Eller
Attorney, Agent, or Firm—James M. Spicer; Bruce M. Winchell

[57] ABSTRACT

An arrangement for stowing releasable end effectors for manipulator arms wherein the end effector includes a releasable latch mechanism for connecting the end effector to the manipulator arm, and a storage holder is provided which includes an arrangement for actuating the latch mechanism as the end effector is moved into and out of the holder by the action of the manipulator arm.

9 Claims, 4 Drawing Sheets

REMOTE TONG/TOOL LATCH AND STORAGE BRACKET FOR AN ADVANCED SERVO-MANIPULATOR

The United States Government has rights in this invention pursuant to contract with the Department of Energy.

FIELD OF THE INVENTION

The present invention relates to storage arrangements for end effectors in connection with manipulator arm devices generally and, more particularly, to arrangements for attaching and detaching end effectors of manipulator arm devices.

BACKGROUND OF THE INVENTION

Mechanical and electro-mechanical manipulator arms are commonly equipped with end effectors such as a pair of tongs or jaws that are capable of gripping and lifting loads in the range of 20–100 lbs. Some end effectors such as nut runners have specialized functions such as turning bolts, nuts and the like. Others include grips having fingers, for holding wrenches or grips for opening boxes, or removing lids, hammering, hooking, applying leverage and the like.

The arms are commonly used in remotely controlled, servo-driven manipulator systems, called servo-manipulators, such as those currently being developed at the Oak Ridge National Laboratory of the Department of Energy for advanced applications. These systems operate the arms of their master and slave units across distances of 500 feet or more.

Slave servo-manipulators have been developed that are particularly suited for remote handling of highly radioactive materials in hot-cell facilities. Because human access to the hot-cells is not permitted, it is the practice in these facilities to employ more than one slave unit in each hot-cell so that they can perform maintenance functions on each another. To this end, the servo-manipulators have been modularized so that each servo-manipulator can be broken-down by the other unit into modularized parts. The module needing servicing can be replaced with a module from a store of spare modules located in the hot cell.

The operations necessary for the breakdown and replacement of the modules requires a wide range of different and intricate mechanical operations. The manipulator effecting the servicing usually must change end effectors to execute all of the servicing steps.

Thus, there is a need for making the end effectors both replaceable and easily interchangeable.

Heretofore, end effectors had been attached to the rest of the servo-manipulators with bolts or the like. These prior arrangements are difficult for the servo-manipulator to connect and disconnect, particularly if the caustic environment of the hot-cell causes the bolts to corrode and stick. If any one bolt becomes so stuck that the servo-manipulator lacks the strength to loosen it, then that servo-manipulator is unserviceable and the regular operations of the hot-cell facility must be interrupted to correct the problem.

When one servo-manipulator is servicing another one located in the hot-cell, the other unit is oftentimes not available to assist the first one with its change of end effectors. Accordingly, there is a need for an arrangement which permits rapid change of end effectors on servo-manipulators by remote control, and preferably, by remotely operating a single servo-manipulator, such that it can change its own end effector, instead of having to require the assistance of a second servo-manipulator.

OBJECTS AND SUMMARY OF THE INVENTION

It is therefore an object of the present invention to provide an end effector in the form of a tong assembly for a servo-manipulator which is replaceable by remote control of a servo-manipulator.

Yet another object of the present invention is to provide an attachment arrangement which minimizes the risk of a end effector becoming stuck in a servo-manipulator such that its replacement by remote control is frustrated.

It is another object of the present invention to provide a end effector which can be replaced without the loosening of bolts or the like.

It is yet another object of the present invention to provide an arrangement for attaching or releasing a end effector from a servo-manipulator which can be actuated by the same servo-manipulator upon which the replacement is taking place.

Still another object of the present invention is to provide a variety of end effectors for a remotely controlled servo-manipulator, which may be changed by the servo-manipulator in a short amount of time.

It is another object of the invention to provide a storage rack for the end effectors wherein said rack itself acts as the attachment actuator for the end effector.

It is a further object of the invention to provide a tong assembly with a positive latching mechanism whereby accidental release of the tong assembly is prevented.

It is a still further object of the invention to provide a method for gaining greater flexibility in the choice of end effectors for specialized purposes as required in hot-cell work.

These and other objects are achieved with the present invention which provides an arrangement for stowing end effectors of manipulators, wherein the end effector includes a releasable arrangement for connecting the end effector to the manipulator and a storage holder is provided which includes an arrangement for actuating the releasable connecting arrangement. The holder itself is adapted to be affixed to an external support such as a wall of a hot-cell.

More particularly, the present invention provides an arrangement for stowing a tong-assembly of a servo-manipulator, comprising a latch mechanism and a holder. The latch mechanism includes a housing attached to the tong assembly and an arrangement for releasably securing the housing to a manipulator arm, e.g. to wrist portion of a servo-manipulator. The latch mechanism includes a clamping member moveable relative to the latch housing between a clamping position and a retracted position and an arrangement for biasing the clamping member toward the clamping position. The holder defines an initial receipt position and a latch release position for the latch mechanism and comprises an arrangement for slidingly receiving the latch mechanism in the initial receipt position and an arrangement for guiding the latch mechanism along a path between the initial receipt position and the latch release position. The holder further includes an arrangement for urging the clamping member toward the retracted position as the latch mechanism is moved along the path toward the latch release position.

BRIEF DESCRIPTION OF THE DRAWINGS

A preferred embodiment of the present invention is described in detail below with reference to the drawings, wherein.

DETAILED DESCRIPTION OF THE PREFERRED EMBODIMENTS

Figure 1:
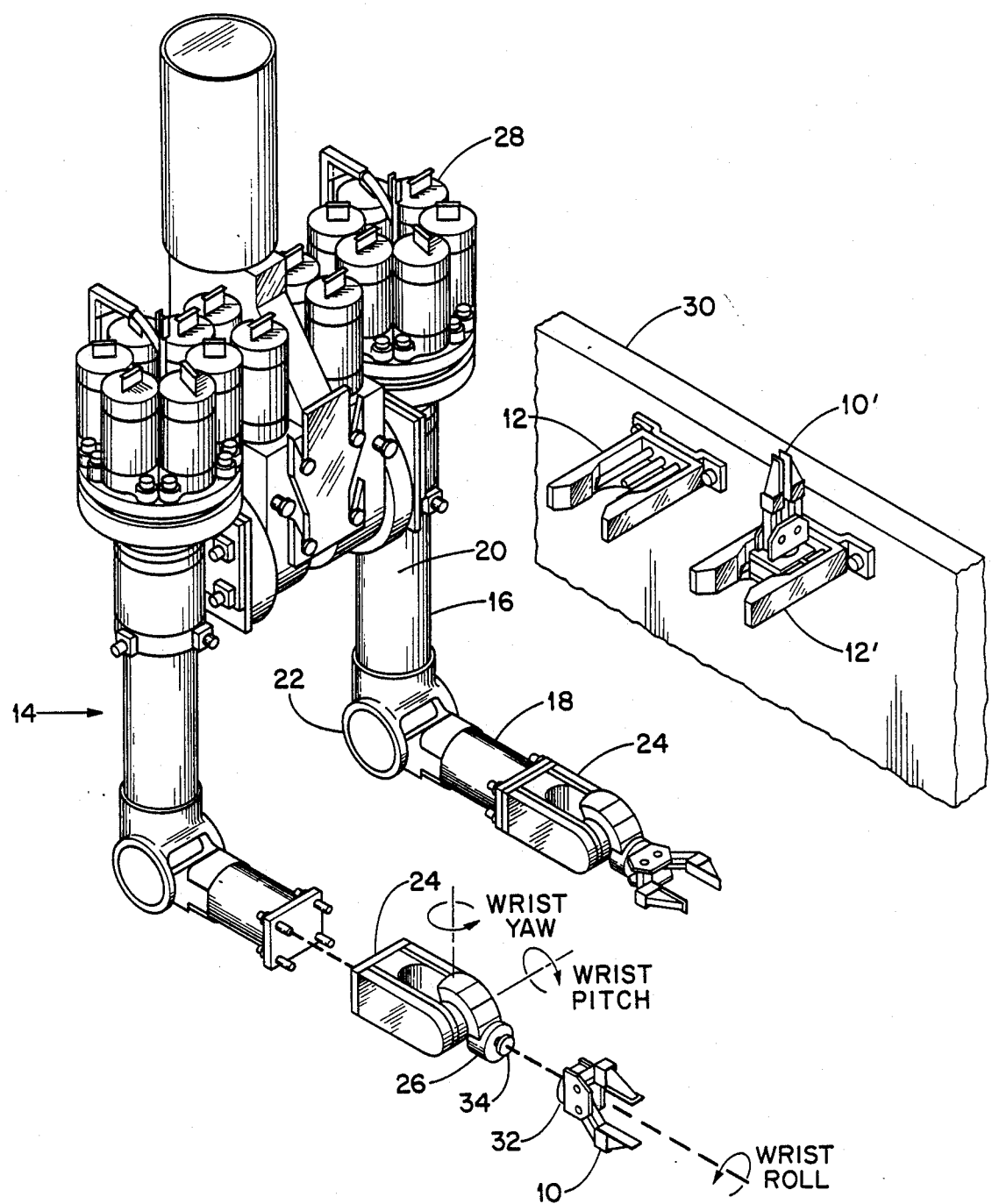
FIG. 1 is a perspective view of a servo-manipulator together with end effectors and holders in accordance with a preferred embodiment of the present invention.

Referring to FIG. 1, the present invention provides a tong assembly 10 and a holder 12 which cooperate to attach and detach the tong assembly 10 to and from a servo-manipulator 14.

The servo-manipulator 14 typically includes manipulator arms 16 having a forearm 18 connected to an upper arm 20 at an elbow joint 22. Attached to the distal end of the forearm 18 is a wrist assembly 24, whose internal arrangement effects rotation of the wrist connector housing 26 about a wrist yaw axis and wrist pitch axis. Movement of the components of the servo-manipulator 14 is controlled by mechanical or electromechanical servo-motors 28. The motors 28 are controlled from a master unit at a remote location (not shown). Details of the servo-manipulator 14 are set forth in the co-pending U.S. patent application entitled Advanced Servo-Manipulator, Ser. No. 720,449 of William E. Holt et al, filed Apr. 5, 1985.

The holder 12 of the present invention is adapted to be fixed to an external support from the servo-manipulator, such as a rack which travels with the servo-manipulator or a wall 30 of a hot-cell in which the servo-manipulator 14 is situated. One or more additional holders 12' are provided on the wall 30 to hold other end effectors 10' having the same or different capacities as the tong assemblies 10 already placed on the servo-manipulator 14.

The tong assembly 10 is provided with a latch mechanism 32 which releasably engages a first driven member 34 located at the face of the wrist connector housing 26. The first driven member 34 is caused to rotate relative to the wrist connector housing 26 upon actuation of one of the servo-motors 28.

Figure 2:
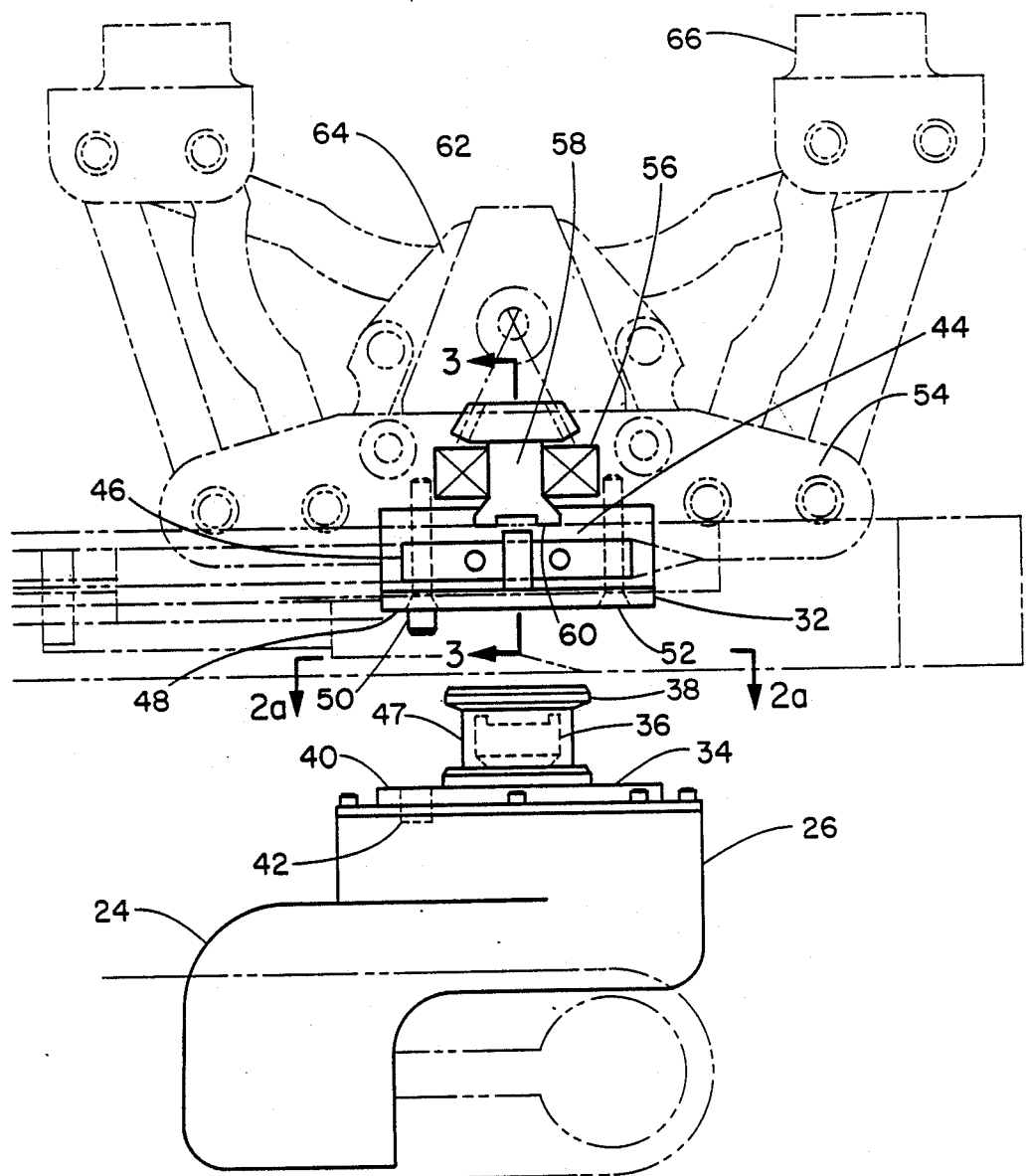
FIG. 2 is a partial cross-sectional view of a tong assembly and holder, together with a wrist assembly of a servo-manipulator, all constructed in accordance with a preferred embodiment of the present invention.
Figure 2A:
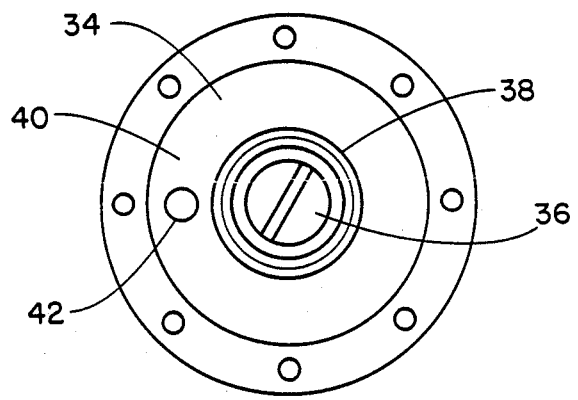
FIG. 2a is a plan view of the face of the wrist assembly of FIG. 2.

Referring now to FIGS. 2 and 2a, the wrist connector housing 26 is also provided with a second driven member 36 which is located concentrically within the first driven member 34. The second driven member 36 is rotatable relative to the wrist connector housing 26 upon actuation of a second servo-motor 28.

The first driven member 34 includes a beveled locking protuberance 38 and a face portion 40 in which is provided a recess 42. The first and second driven members 34 and 36 are rotatable independently of each other.

The latch mechanism 32 includes a latch housing 44 and a clamping member 46 which is adapted to releasably engage a barrel portion 47 of protuberance 38 on first driven member 34. When so engaged, the lower surface 48 of the latch mechanism 32 preferably contacts the face 40 of the first driven member 34. In the preferred embodiment, a bolt head 50 extending beyond the lower surface 48 fits into the recess 42 on the first driven member 34 so as to register the first driven member 34 with the latch mechanism 32. The bolt 50 and flushly mounted bolts 52 secure the latch mechanism 32 permanently to a tong actuator module 54. The tong assembly 10 and latch mechanism 32 thus rotate as a unit when the first driven member 34 is operated.

The latch housing 44 also supports bearings 56 and a coupling member 58, which are arranged so that the coupling member 58 is rotatable relative to the housing 44. The lower end of the coupling member 58 includes a half coupling arrangement 60 adapted to matingly engage second driven member 36 when the clamping member 46 secures the latch mechanism 32 to the first driven member 34 of the wrist connector housing 26. The opposite end of the coupling member 58 includes a beveled gear 62 which operatively engages an actuator portion 64 of tong actuator module 54. Operation of actuator portion 64 by the second driven member 36 moves the tong members 66 of tong actuator module 54. The internal workings of the tong actuator module 54, including its actuator portion 64, are typical of those in the field.

Figure 3:
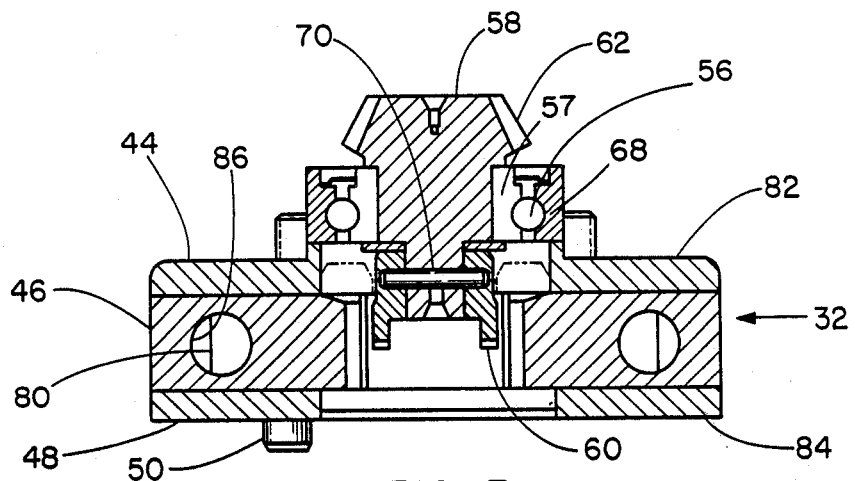
FIG. 3 is a cross-sectional side view of the tong assembly taken along line III—III in FIG. 2.

Referring to FIG. 3, the latch mechanism 32 includes an annular bearing retainer 68 for holding the ball bearings 56 against a shoulder 57 provided on the coupling member 58. An anti-rotation pin 70 connects the half-coupling 60 with the coupling member 58.

Figure 5:
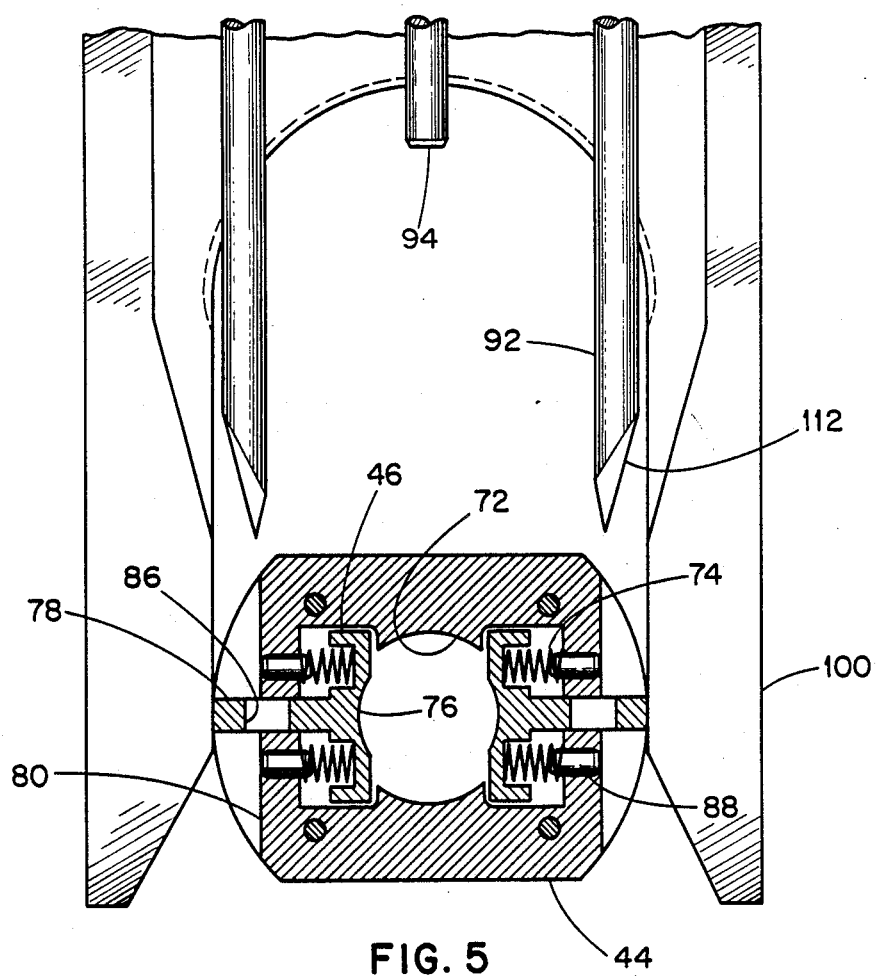
FIG. 5 is a top partially sectional view of the holder and the tong assembly of FIG. 1 in a latched condition on being removed from the holder assembly.

As shown in FIGS. 3 and 5, clamping members 46 are provided at both sides of an aperture 72, which aperture receives the protuberance 38 of the first driven member 34. The clamping members 46 are urged inwardly into engagement with barrel portion 47 of protuberance 38 on first driven member 34 by the action of compression springs 74. Pins 88 are provided in the latch housing 44 to facilitate retention of the springs 74. The engaging end portions 76 of the clamping members 46 are circularly beveled so as to promote surface-to-surface contact with the first driven member 34. The opposite end portions 78 of the clamping members 46 extend out of the latch housing 44 proper and into side slots 80 defined between upper and lower cover portions 82 and 84 of the latch housing 44. Each clamping member 46 is provided with an aperture or slot 86 in its opposite end portion 78. When the clamping members 46 are located in their clamping position, (FIGS. 3 and 5) the aperture 86 is located only partially outside of the latch housing 44 in the side slots 80.

Figure 4:
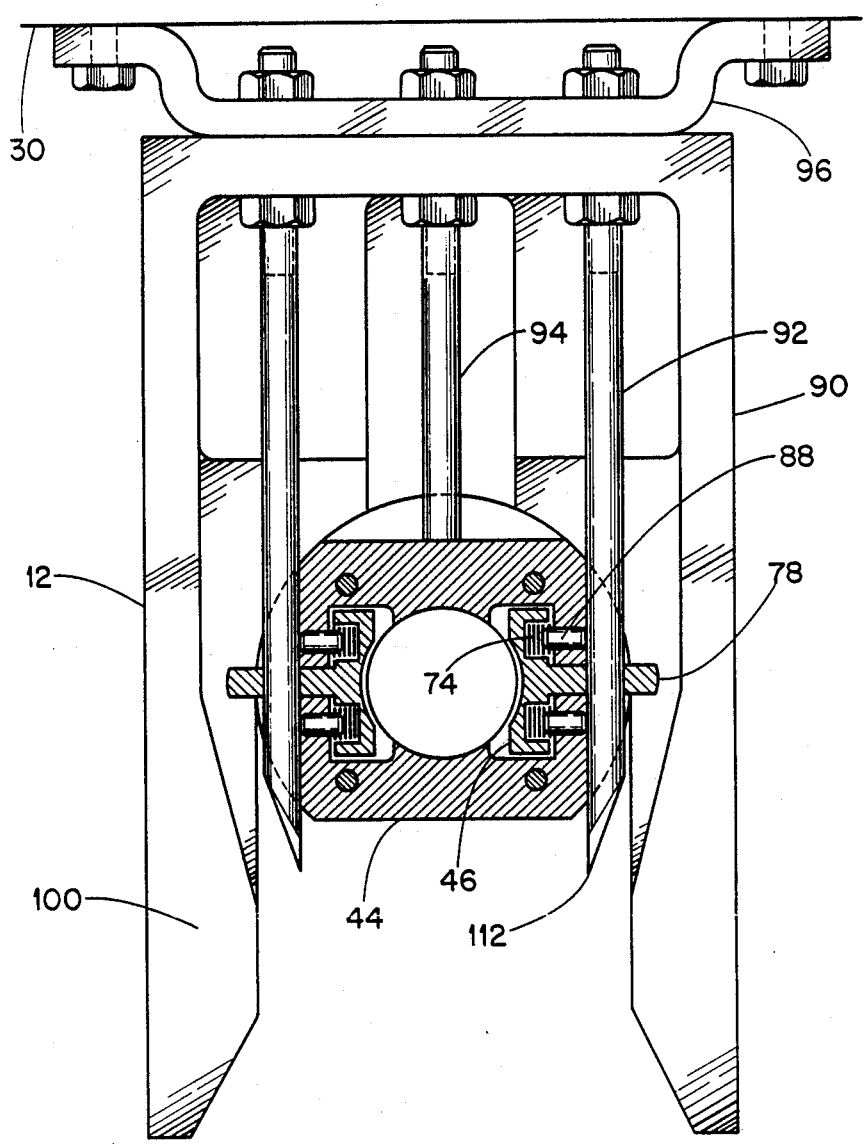
FIG. 4 is a top partially sectional view of the holder and the tong assembly of FIG. 1 in an unlatched, first position.

Referring to FIG. 4, which shows the latch mechanism in the latch release position, the clamping members 46 may be urged into retracted position permitting release of the latching mechanism 32 from the first driven member 34. In this retracted position, the apertures 86 are more fully if not completely extended out from the latch housing 44 and located in the side slots 80.

Figure 6:
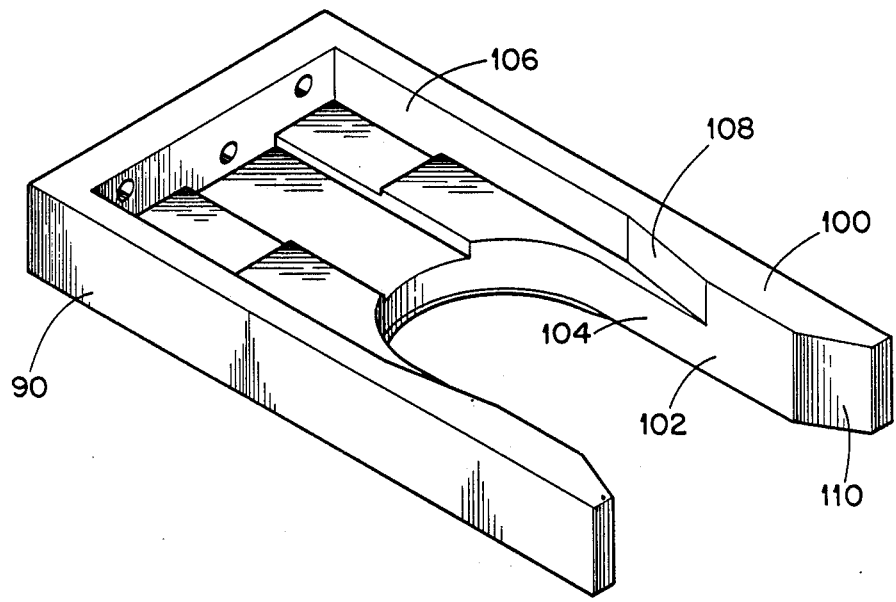
FIG. 6 is a detailed perspective view of a bracket portion of the holder of FIG. 1.

As shown in FIGS. 4 and 6, holder 12 preferably comprises a bracket 90, a pair of elongate members or pins 92, a stop member 94 and an attachment arrangement 96 for securing holder 12 to an external support such as wall 30.

The bracket 90 is preferably constructed as a unitary piece, which includes generally parallel finger portions 100. Finger portions 100 define opposing guide surfaces 102 which are spaced apart sufficiently to permit passage of the latch housing 44 therebetween, with the clamping members 46 extended into their clamping position. The surfaces 104 extend preferably continuously from the guide surfaces 102 to define therebetween a width of an axial slot in the lower portion of the bracket 90. The surfaces 104 are arranged to guide the housing 44, in particular its lower cover portion 84, into a latch release position against the stop 94. Surfaces 106 of the bracket 90 are spaced further apart than the guide surfaces 102 so as to provide clearance for the opposite end portions 78 of the clamping members 46 when the clamping members are retracted. Surfaces 108 form a transition between the surfaces 106 and the guide surfaces 102. Beveled surfaces 110 precede the guide surfaces 102 to assist in initial alignment of the latch housing 44 relative to the guide surfaces 102.

Referring again to FIG. 5, which shows the latch mechanism in its initial receipt position between guide surfaces 102 of finger portions 100, the free ends of the elongated pin members 92 are provided with camming surfaces 112, which in the preferred embodiment define a pointed end for the pin members 92. The camming surfaces 112 are situated relative to the guide surfaces 102 such that as the latch mechanism 32, together with an attached end effector 10, is passed between the guide surfaces 102 by movement of the wrist assembly 24, the portion of the aperture 86 exposed in the side slot 80 is aligned and sufficiently exposed to receive the camming surfaces 112. Once the camming surfaces 112 engage the aperture 86 and the latch mechanism 32 is urged toward the stop member 94, the elongate pin members 92 withdraw the clamping members 46 to their retracted positions and assist in guiding the latch mechanism 32 to its stowed, latch release position. Rotation of the latch housing 44 is prevented by the engagement of the elongated pin members 92 with the apertures 86 and the surfaces along the side slot 80 of the latch housing 44.

Once the wrist assembly 24 has moved the latch mechanism 32 and the tong assembly 10 to the latch release position, the wrist assembly 24 is disconnected therefrom by lowering it relative to the holder 12, which movement is accommodated by the axial slot defined by surfaces 104 of the bracket 90. Because the clamping members are held by the pin members 92 in their retracted position, the first driven member 34 may be withdrawn from the latch housing 44 without having to unloosen any bolts or the like.

For reattaching the latch mechanism 32 to the wrist connector housing 26, the above process is reversed, whereby the movement of the latch mechanism 32 from the latch release position down along the pin members 92 and then through the initial receipt position between guide surfaces 102 causes the clamping members 46 to engage the first driven member 34.

The invention as exemplified above provides a method and apparatus for remotely changing tong assemblies 10 conveniently and with a minimum amount of effort and time. The inventor also allows the servo-manipulator to effect its own change of tong assemblies.

The invention further provides a universal design for holding special purpose tongs to be used by an advanced servo-manipulator and provides a unique mechanism to prevent accidental release of the latch.

It is to be understood that the present invention may be embodied in other specific forms without departing from the spirit or essential characteristics of the invention. For instance, the particular form of the bracket 90 could be varied significantly. The particular designs of the latch mechanism 32 could also be widely varied. The preferred embodiment is therefore to be considered illustrative and not restrictive. The scope of the invention is indicated by the claims rather than by the foregoing descriptions, and all changes or variations which fall within the meaning and range of the claims are therefore intended to be embraced therein.

What is claimed is:

1. An arrangement for stowing a releasable end effector for a manipulator arm, comprising:
   a latch mechanism comprising a housing,
   means for affixing said housing to an end effector,
   means for releasably securing said housing to a manipulator arm, said releasably securing means including a clamping member movable relative to said housing between a clamping position and a retracted position, and
   means for biasing said clamping member toward said clamping position; and
   a holder defining an initial receipt position and a latch release position for said latch mechanism, said holder comprising
   means for slidably receiving said latch mechanism in said initial receipt position,
   means for guiding said latch mechanism along a path between said initial receipt position and said latch release position, said guiding means comprising at least one elongate member extending parallel to said path, said elongate member supporting said latch mechanism in said latch release position, and
   means for urging said clamping member toward said retracted position as said latch mechanism is moved along said path toward said latch release position, said urging means comprising a camming surface located at a free end portion of said elongate member, said receiving means comprising finger members having guide surfaces located adjacent said free end portion and aligned with said path, said guide surfaces being spaced apart so as to slidingly receive sides of said latch mechanism with said clamping member in said clamping position, said finger members including second surfaces generally parallel and coextensive with said elongate member, said second surfaces being spaced further apart than said guide surfaces to accommodate said clamping member in said retracted position.

2. An arrangement as claimed in claim 1, wherein said finger members further include surfaces adjacent said camming surfaces and converging toward said guide surfaces for urging said clamping member toward said clamping position as said latch mechanism is moved from said latch release position toward said initial receipt position.

3. An arrangement for stowing a releasable end effector for a manipulator arm, comprising:
   a latch mechanism comprising a housing,
   means for affixing said housing to an end effector,
   means for releasably securing said housing to a manipulator arm, said releasably securing means including a clamping member movable relative to said housing between a clamping position and a retracted position, and
means for biasing said clamping member toward said clamping position; and
a holder defining an initial receipt position and a latch release position for said latch mechanism, said holder comprising
means for slidably receiving said latch mechanism in said initial receipt position,
means for guiding said latch mechanism along a path between said initial receipt position and said latch release position, and
means for urging said clamping member toward said retracted position as said latch mechanism is moved along said path toward said latch release position,
said receiving means comprising finger members having free end portions, said free end portions including convergent surfaces, said finger members also including guide surfaces located adjacent said convergent surfaces and aligned with said path, said guide surfaces being spaced apart so as to slidingly receive sides of said latch mechanism with said clamping member in said clamping position, said convergent surfaces and said guide surfaces being used for receiving said latch mechanism into said initial receipt position as said latch mechanism is introduced into said holder, said guiding means comprising at least one elongate member extending parallel to said path, said elongate member supporting said latch mechanism in said latch release position, and said urging means comprises a camming surface located at a free end of said elongate member.

4. An arrangement for stowing a releasable end effector for a manipulator arm, comprising:
a latch mechanism comprising a housing,
means for affixing said housing to an end effector,
and means for releasably securing said housing to a manipulator arm, said releasably securing means including
a clamping member movable relative to said housing between a clamping position and a retracted position,
an aperture in said housing adapted to receive a connector for a manipulator arm,
and means for biasing said clamping member toward said clamping position, said biasing means including means for urging a first end portion of said clamping member into said aperture in a direction transverse to a longitudinal axis of said aperture, said clamping member including an opposite end portion located outside of said housing when said clamping member is in said retracted position, said opposite end portion being provided with an engaging aperture, said engaging aperture being partially exposed outside of said housing when said clamping member is in said clamping position; and
a holder defining an initial receipt position and a latch release position for said latch mechanism, said holder comprising
means for slidably receiving said latch mechanism in said initial receipt position,
means for guiding said latch mechanism along a path between said initial receipt position and said latch release position, said guiding means comprising at least one elongate member extending parallel to said path, said elongate member supporting said latch mechanism in said latch release position,
and means for urging said clamping member toward said retracted position as said latch mechanism is moved along said path toward said latch release position, said urging means comprising a camming surface located at a free end of said elongate member, whereby as said latch mechanism is moved from said initial receipt position toward said latch release position, said engaging aperture slidingly engages said camming surface to urge said clamping member to said retracted position.

5. An arrangement as claimed in claim 4, wherein said guiding means comprises two parallel elongate members.

6. An arrangement for stowing a releasable tong assembly for a manipulator arm, comprising:
a latch mechanism comprising a housing,
means for affixing said housing to a tong assembly,
means for releasably securing said housing to a manipulator arm, said releasably securing means including a clamping member movable relative to said housing between a clamping position and a retracted position, and
means for biasing said clamping member toward said clamping position; and
a holder defining an initial receipt position and a latch release position for said latch mechanism, said holder comprising
means for slidably receiving said latch mechanism in said initial receipt position,
means for guiding said latch mechanism along a path between said initial receipt position and said latch release position, said guiding means comprising at least one elongate member extending parallel to said path, said elongate member supporting said latch mechanism in said latch release position, and
means for urging said clamping member toward said retracted position as said latch mechanism is moved along said path toward said latch release position, said urging means comprising a camming surface located at a free end portion of said elongate member,
said receiving means comprising finger members having guide surfaces located adjacent said free end portion and aligned with said path,
said guide surfaces being spaced apart so as to slidingly receive sides of said latch mechanism with said clamping member in said clamping position,
said finger members also defining a slot located beneath said latch release position to accommodate movement of a manipulator arm into and out of engagement with said latch mechanism in said latch release position,
said latch mechanism further comprising means for transmitting mechanical action from a tong drive element of a manipulator arm engaged with said latch mechanism to a tong actuator in said tong assembly affixed to said latch mechanism.

7. An arrangement as claimed in claim 6, wherein said housing is provided with means for engaging a rotatable wrist-roll drive element of a manipulator arm engaged with said latch mechanism so that said housing and said tong assembly are rotatable with said wrist roll drive element.

8. A combination comprising:
a tong assembly comprising a tong housing, tong members supported from said housing and a tong actuator in said housing;
a wrist assembly of a servo-manipulator including first driven means for rotating said tong housing about an axis and second driven means for driving said tong actuator, said first driven means including a rotatable member, said tong housing being provided with latch means for releasably engaging said tong housing with said rotatable member, said tong housing being further provided with means for receiving said second driven means, said receiving means being operatively connected with said tong actuator; and a holder for storing said tong assembly and said latch means separate from said wrist assembly, said holder including means for operating said latch means when said wrist assembly moves said tong assembly into and out of said holder.

9. A combination as claimed in claim 8, further comprising releasable means for registering said tong housing with said rotatable member so that said tong housing and said rotatable member rotate together, said registering means and said latch means being releasable concurrently.

* * * * *